(12) United States Patent
Lee (10) Patent No.: US 11,539,277 B2
(45) Date of Patent: Dec. 27, 2022

(54) MOTOR FOR SEAT SLIDING DEVICE OF VEHICLE

(71) Applicant: DAS Co., Ltd., Gyeongsangbuk-do (KR)

(72) Inventor: Kwang Sin Lee, Gyeonggi-do (KR)

(73) Assignee: DAS CO., LTD., Gyeongsangbuk-Do (KR)

( * ) Notice: Subject to any disclaimer, the term of this patent is extended or adjusted under 35 U.S.C. 154(b) by 154 days.

(21) Appl. No.: 17/090,529

(22) Filed: Nov. 5, 2020

(65) Prior Publication Data

US 2021/0408884 A1 Dec. 30, 2021

(30) Foreign Application Priority Data

Jun. 26, 2020 (KR) .................. 10-2020-0078485

(51) Int. Cl.

| | |
|---|---|
| H02K 3/50 | (2006.01) |
| H02K 29/03 | (2006.01) |
| H02K 1/14 | (2006.01) |
| H02K 1/278 | (2022.01) |
| B60N 2/06 | (2006.01) |
| H02K 21/16 | (2006.01) |

(Continued)

(52) U.S. Cl.
CPC ............ H02K 29/03 (2013.01); B60N 2/0232 (2013.01); B60N 2/06 (2013.01); H02K 1/146 (2013.01); H02K 1/278 (2013.01); H02K 1/30 (2013.01); H02K 21/16 (2013.01)

(58) Field of Classification Search
CPC .. H02K 7/06; H02K 3/50; H02K 3/47; H02K 2203/03
See application file for complete search history.

(56) References Cited

U.S. PATENT DOCUMENTS 4,852,245 A * 8/1989 Denk ........................ H02K 3/47
29/606
4,968,911 A * 11/1990 Denk ........................ H02K 3/47
310/179

(Continued)

FOREIGN PATENT DOCUMENTS

| JP | 2015063212 A | 4/2015 |
|---|---|---|
| JP | 2018/139245 A1 | 8/2018 |

(Continued)

OTHER PUBLICATIONS

Office Action issued in connection with Indian Patent Application No. 202044048151 dated Jan. 20, 2022.

(Continued)

*Primary Examiner* — Dang D Le
(74) *Attorney, Agent, or Firm* — Tarolli, Sundheim, Covell & Tummino LLP (57) ABSTRACT

The present disclosure relates to a motor for a seat sliding device of a vehicle, and includes a coil module in which a plurality of first coils and a plurality of second coils are seamlessly disposed in the circumferential direction to have a cylindrical shape. Therefore, the conventional stator core having a slot and a tooth for installing the coil is not used, thereby implementing miniaturization and light-weight of a motor. and the slot and the tooth do not exist, thereby reducing a cogging torque and reducing the vibration and noise of the motor.

7 Claims, 7 Drawing Sheets

(51) Int. Cl.
*B60N 2/02* (2006.01)
*H02K 1/30* (2006.01)

(56) References Cited

U.S. PATENT DOCUMENTS

| | | | | | |
|---|---|---|---|---|---|
| 6,013,963 | A | * | 1/2000 | Shelton, Jr. | H02K 1/278 |
| | | | | | 310/156.19 |
| 6,531,798 | B1 | * | 3/2003 | Palmero | H02K 16/00 |
| | | | | | 310/12.32 |
| 7,544,142 | B2 | | 6/2009 | Schueler | |
| 8,860,277 | B2 | * | 10/2014 | Kimiabeigi | H02K 3/28 |
| | | | | | 310/179 |
| 9,827,879 | B2 | | 11/2017 | Fujita | |
| 10,495,198 | B2 | * | 12/2019 | Hyun | H02K 7/083 |
| 11,075,556 | B2 | * | 7/2021 | Takeuchi | H02K 41/03 |

FOREIGN PATENT DOCUMENTS

| | | | |
|---|---|---|---|
| KR | 10-2016-0084541 | A | 7/2016 |
| KR | 10-2019-0048406 | A | 5/2019 |
| KR | 101991256 | B1 | 6/2019 |

OTHER PUBLICATIONS

Office Action issued in connection with Korean Patent Application No. 9-5-2021-096629988 dated Dec. 8, 2021.
Office Action issued for corresponding Korean application 10-2020-0078485, dated Aug. 17, 2022.

* cited by examiner

MOTOR FOR SEAT SLIDING DEVICE OF VEHICLE

CROSS-REFERENCE TO RELATED APPLICATION

This application claims priority to Korean Patent Application No. 10-2020-0078485, filed on Jun. 26, 2020, the disclosure of which is incorporated herein by reference in its entirety.

BACKGROUND OF THE DISCLOSURE

Field of the Disclosure

The present disclosure relates to a motor for a seat sliding device for a vehicle, and more specifically, to a motor installed on a slide rail of a seat and used to slide the seat of a vehicle in a back-and-forth direction.

Description of the Related Art

A seat of a vehicle is installed to be movable in the back-and-forth direction to be adjustable according to the body condition of a passenger.

The seat is mounted on a floor via a slide rail, and a lower rail of the slide rail is fixed to the floor, and the seat is fixed to an upper rail. A lead screw is fixed to the lower rail inside the slide rail and a hollow-type motor having a nut screw-coupled to the lead screw is fixed to the upper rail. The lead screw is installed in a state of penetrating the inside of the motor.

Therefore, when the motor is operated, the motor is moved in the back-and-forth direction of the lead screw according to the rotating direction thereof, such that the upper rail mounted with the motor is moved and the seat installed on the upper rail is moved in the back-and-forth direction, thereby adjusting the location of the seat.

Figure 1:
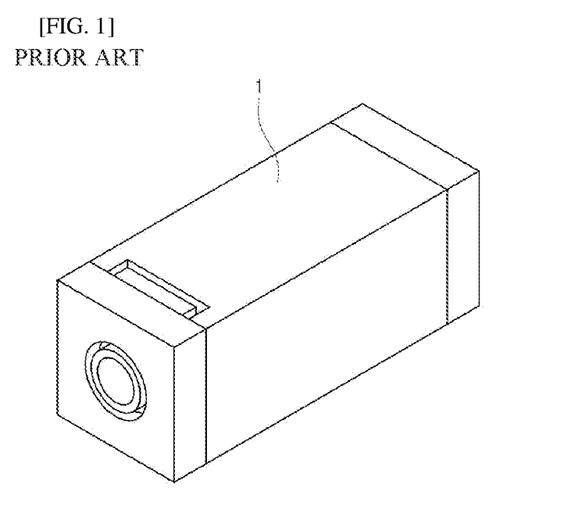
FIG. 1 is a perspective diagram illustrating a motor for a seat sliding device of a vehicle according to the related art.
Figure 2:
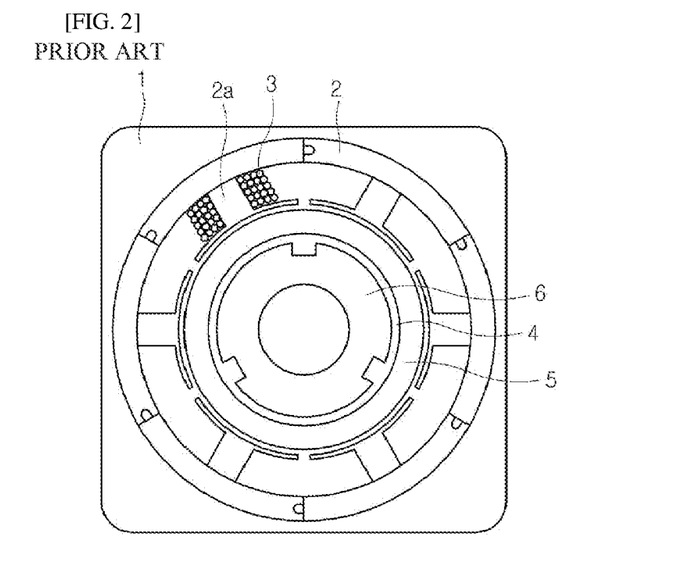
FIG. 2 is a side cross-sectional diagram illustrating the motor according to the related art.
Figure 3:
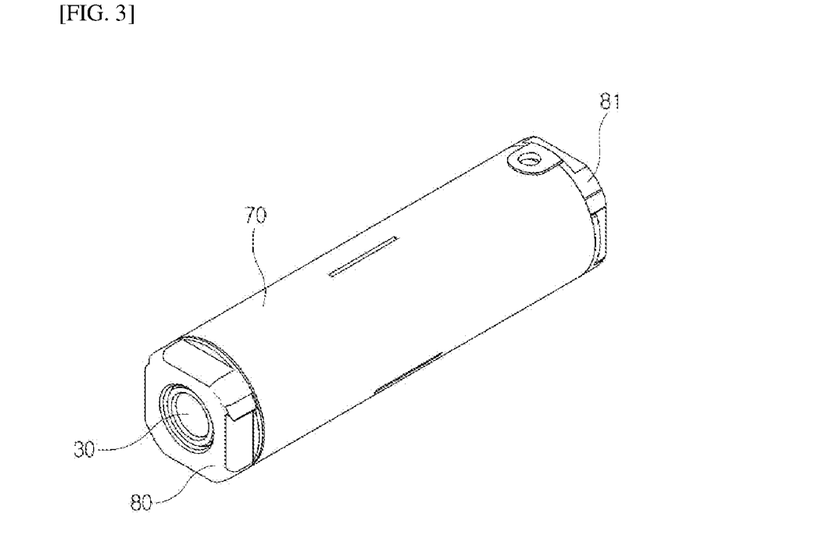
FIG. 3 is a perspective diagram illustrating a motor for a seat sliding device of a vehicle according to the present disclosure.
Figure 4:
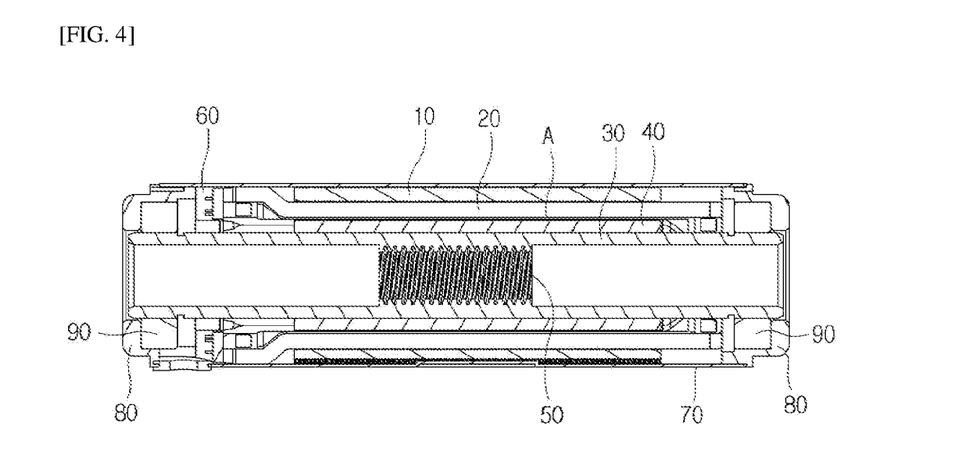
FIG. 4 is a front cross-sectional diagram illustrating the motor according to the present disclosure (cross-sectional diagram taken along the line A-A illustrated in FIG. 3).

FIGS. 1 and 2 illustrate a motor for a seat sliding device according to the related art and a cross-sectional diagram of the motor, respectively.

The motor for the seat sliding device is a brushless DC (BLDC) motor, and has a stator core 2 fixed and installed inside a case 1 and a rotor sleeve 4 rotatably installed inside the stator core 2.

The stator core 2 is formed with a slot 2a every predetermined interval in the circumferential direction, and a coil 3 is wound around a tooth 2b between the slot 2a and the slot 2a.

A cylindrical permanent magnet 5 in which an N pole and an S pole are repetitively magnetized in the circumferential direction is installed on the outer circumferential surface of the rotor sleeve 4, and a nut 6 is installed on the inner circumferential surface thereof.

Therefore, when a magnetic field polarity formed in a plurality of coils 3 circumferentially disposed on the stator core 2 is sequentially changed by controlling the current supply, the rotor sleeve 4 is continuously rotated by the magnetic relationship with the permanent magnet 5.

Therefore, the rotor sleeve 4 is moved along the lead screw. Since this means that the motor is moved along the lead screw, the seat may be resultantly moved in the back-and-forth direction, thereby adjusting the location of the seat.

Meanwhile, since the aforementioned conventional motor is formed with the slot 2a and the tooth 2b in order to install the coil 3 on the stator core 2, the size of the stator core 2 is inevitably increased, such that there is a problem in that the size and weight of the entire motor is increased.

Further, the slot 2a and the tooth 2b exist every predetermined interval in the circumferential direction, thereby generating a cogging torque, such that there is a problem in that a torque ripple is generated, thereby increasing the vibration and noise of the motor.

RELATED ART DOCUMENT (Patent Document)
(Patent Document 1) Korean Patent No. 10-1991256 (Jun. 21, 2019)

SUMMARY OF THE DISCLOSURE

Therefore, the present disclosure is intended to solve the above problems, and an object of the present disclosure is to provide a motor for a seat sliding device of a vehicle which may implement miniaturization and light-weight, and reduce noise and vibration.

The present disclosure for achieving the object includes: a back yoke; a coil module inserted into and supported by the back yoke, and composed of a plurality of first coils and a plurality of second coils having a cylindrical shape in an assembled state; a rotor sleeve inserted into the coil module in a rotatable state; a permanent magnet installed on the outer circumferential surface of the rotor sleeve and having multiple poles formed in the circumferential direction; and a nut provided inside the rotor sleeve.

The first coil and the second coil are formed in the shape of a cylindrically split body in which a cylinder is split every predetermined interval in the circumferential direction.

The first coil and the second coil comprise bodies composed of two straight portions parallel to each other, and the respective ends connecting both ends of the bodies, have a pair of terminals formed to protrude from the ends (proximal ends) of one sides, and are formed in a rectangular ring shape in which rectangular straight through-holes are formed inside the bodies.

The first coil and the second coil are consecutively disposed in the circumferential direction, and one side body of other type of adjacent coil is inserted into the through-hole of one type of the coil and thus the bodies of the coils consecutively exist without an empty space in the circumferential direction of the coil module.

The first coil is formed such that the proximal end of the ends of both sides is stepped outward in the radial direction with respect to the body, and the second coil is formed such that the other end opposite to the proximal end of the ends of both sides is stepped inward in the radial direction with respect to the body.

The first coil and the second coil have plastic coating layers formed on the surfaces of coil main bodies by insert-injecting the coil main bodies composed of conductors.

A circuit board is formed in a disc shape having a circular through-hole formed therein, and has terminal grooves, into which a terminal of the first coil is inserted, formed in the inner circumferential surface thereof and terminal grooves, into which a terminal of the second coil is inserted, formed in the outer circumferential surface thereof.

As described above, the present disclosure may reduce the size and weight of the motor because the conventional stator core formed with the slot and the tooth is not applied.

Further, the coil module having the compact structure is applied, such that it is possible to implement more miniaturization and light-weight of the motor.

Further, the slot and the tooth do not exist as described above, thereby reducing the cogging torque and the torque ripple and reducing the vibration and noise of the motor.

DESCRIPTION OF SPECIFIC EMBODIMENTS

Since the present disclosure may be variously changed and may have various exemplary embodiments, specific exemplary embodiments will be illustrated in the drawings and described in detail. However, it should be understood that this is not intended to limit the present disclosure to the specific exemplary embodiment, and includes all changes, equivalents, and substitutions included in the spirit and technical scope of the present disclosure. The thickness of the lines, the size of the component, and the like illustrated in the accompanying drawings may be exaggeratively illustrated for clarity and convenience of explanation.

Further, the terms to be described later are the terms defined in consideration of the functions according to the present disclosure and these terms may be changed according to the user or the operator's intention or custom. Therefore, these terms should be defined based on the contents throughout the present specification.

Hereinafter, a preferred exemplary embodiment of the present disclosure will be described in detail with reference to the accompanying drawings.

As illustrated in FIGS. 3 to 6, a motor for a seat sliding device of a vehicle according to the present disclosure includes a back yoke 10, a coil module 20, a rotor sleeve 30, a permanent magnet 40, and a nut 50.

The back yoke 10 is a cylindrical component and surrounds and supports the outer circumferential portion of the coil module 20. A cylindrical case 70 configuring the appearance of the motor is installed on the outer circumference of the back yoke 10.

The coil module 20 is assembled such that a plurality of first coils 21 and a plurality of second coils 22 configure one cylindrical structure, and forms a magnetic field by supplying the electricity to rotate the rotor sleeve 30 mounted with the permanent magnet 40. The coil module 20 will be described in more detail later.

The rotor sleeve 30, as a cylindrical hollow shaft, is inserted into the inner space of the coil module 20 and has both ends supported by a bearing 90 to be rotatable in the installation state.

Figure 5:
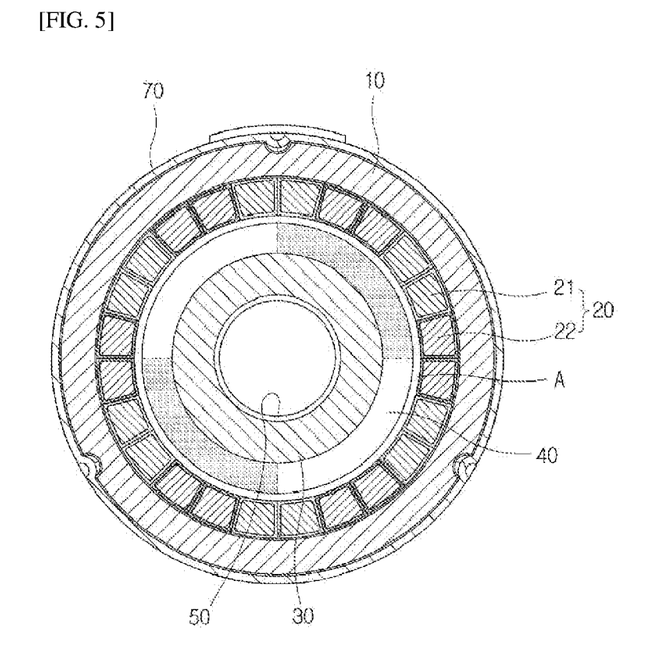
FIG. 5 is a side cross-sectional diagram illustrating the motor according to the present disclosure (cross-sectional diagram taken along the line B-B illustrated in FIG. 3).

The permanent magnet 40 is a cylindrical magnet, and magnetized by repeating an N pole and an S pole every predetermined interval in the circumferential direction. FIG. 5 illustrates a four-pole magnet in which two N poles and two S poles are formed in the direction facing each other.

The permanent magnet 40 is fixed to the outer circumferential surface of the rotor sleeve 30, and an air gap (A) exists between the outer circumferential surface of the permanent magnet 40 and the inner circumferential surface of the coil module 20 such that the permanent magnet 40 and the rotor sleeve 30 may be smoothly rotated with respect to the fixed coil module 20.

The nut 50 is a cylindrical female screw formed on the inner circumferential surface of the rotor sleeve 30 (may be produced as a separate product and also mounted on the inner circumferential surface of the rotor sleeve 30), and screw-fastened to a lead screw installed on a lower rail of a seat slide rail.

Figure 6:
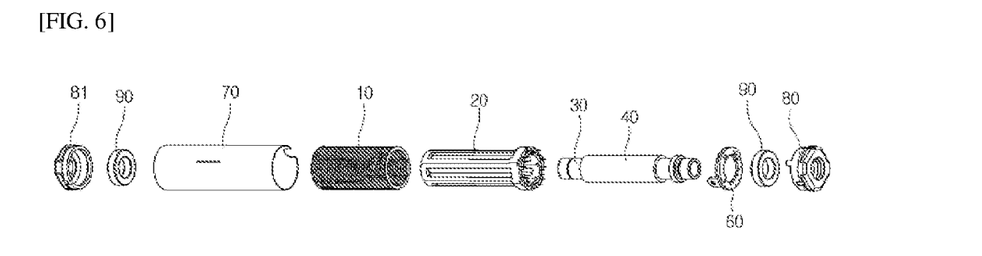
FIG. 6 is an exploded perspective diagram illustrating the motor according to the present disclosure.

Both ends of the case 70 are installed with covers 80, 81 for exposing only both opened ends of the rotor sleeve 30 to the outside and blocking other portions, respectively.

The bearings 90 for supporting both ends of the rotor sleeve 30 are supported by the covers 80, 81 on both sides, respectively.

A circuit board 60 is installed between the cover 80 and the coil module 20 on the inner one side of the case 70. The circuit board 60 is connected to the coil module 20, is formed with a circuit for controlling the power supply to the coil module 20, and has a terminal and an electric wire (not illustrated) for being connected to an external power source of the motor.

Now, the coil module 20 which is the main component of the present disclosure will be described in detail with reference to FIGS. 7 to 12.

Figure 7:
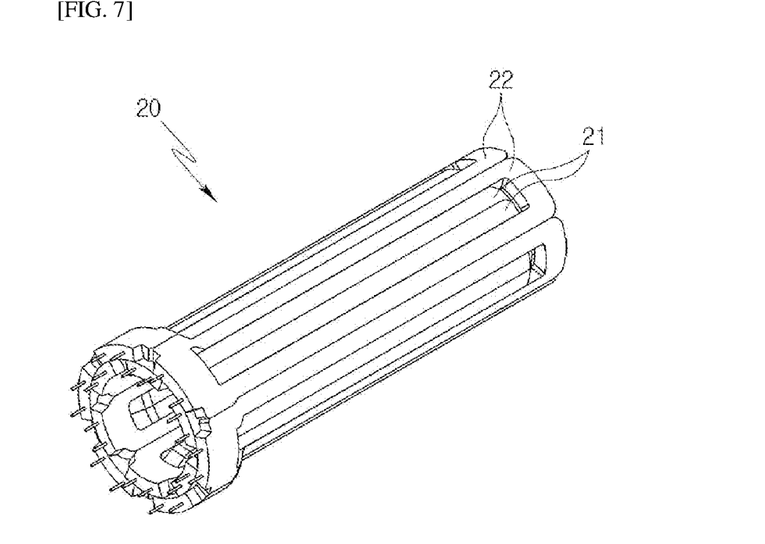
FIG. 7 is a perspective diagram illustrating a coil module which is a component of the present disclosure.

As illustrated in FIG. 7, the coil module 20 is composed of the plurality of first coils 21 and the plurality of second coils 22 which have a cylindrical structure in the assembled state.

Figure 8:
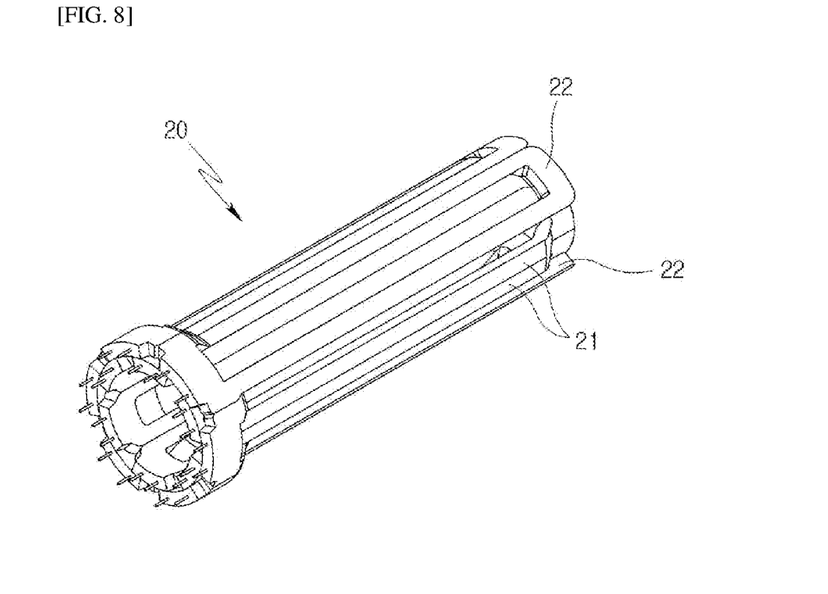
FIG. 8 is a perspective diagram illustrating a state where one second coil is removed from the coil module illustrated in FIG. 7.

FIG. 8 illustrates a state where one second coil 22 is removed from the assembled state illustrated in FIG. 7, and helps to understand the assembled structure of the first coil 21 and the second coil 22. As illustrated, the first coil 21 and the second coil 22 are mutually and repetitively disposed in the circumferential direction to entirely form one cylinder.

Figure 9:
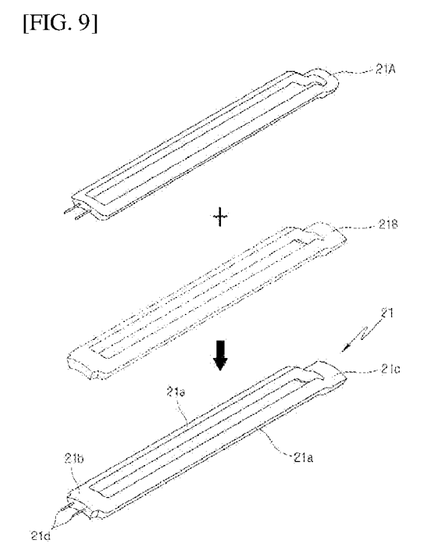
FIG. 9 is a diagram illustrating a first coil which is a component of the coil module.
Figure 10:
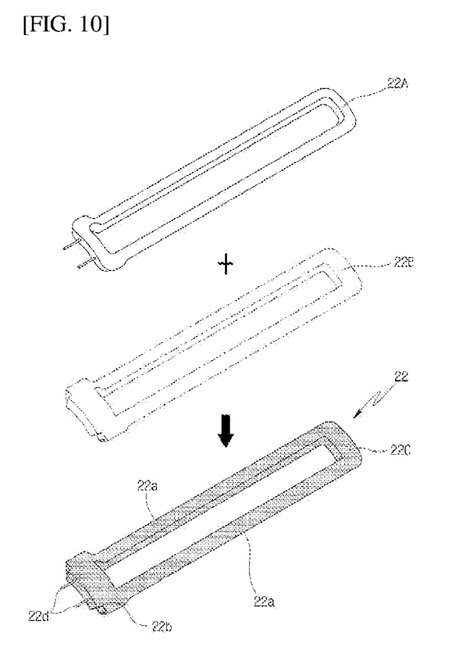
FIG. 10 is a diagram illustrating the second coil which is a component of the coil module.

As illustrated in FIGS. 9 and 10, the first coil 21 and the second coil 22 have a shape of a cylindrically split body in which a cylinder is cut at a predetermined length in the circumferential direction. It may be seen that the first coil 21 and the second coil 22 have a substantially rectangular shape when viewed from the floor but the ends thereof have an arc shape when viewed from both side surfaces thereof to configure a part of the cylinder.

Bodies 21a, 22a of the first coil 21 and the second coil 22 are composed of two straight portions parallel to each other, and both ends of the bodies 21a, 22a are formed with the ends 21b, 21c, 22b, 22c connecting two straight portions. Therefore, through-holes having a straight shape are formed inside the first coil 21 and the second coil 22 in the longitudinal direction.

Further, a pair of terminals 21d, 22d protrude from the proximal ends 21b, 22b connected to the circuit board 60 among the ends of both sides.

The first coil 21 and the second coil 22 are manufactured by insert-injecting the respective coil main bodies 21A, 22A formed in the aforementioned shape to form plastic coating layers 21B, 22B on the surfaces of the coil main bodies 21A, 22A.

That is, in FIGS. 9 and 10, reference numerals 21B, 22B indicated by virtual lines (double dashed line) refer to the coating layers formed on the surfaces of the coil main bodies 21A, 22A and are illustrated for helping to understand the structures and manufacturing processes of the first coil 21 and the second coil 22.

Meanwhile, each of the first coil 21 and the second coil 22 is consecutively disposed in the circumferential direction, and disposed such that the respective bodies 21a, 22a overlap each other to form one cylindrical structure. At this time, to prevent the ends 21b, 21c, 22b, 22c of both sides of the first coil 21 and the second coil 22 from being interfered with each other, the first coil 21 is formed such that the proximal end 21b (the end in which the terminals 21d, 22d are formed to be connected to the circuit board 60) has the same surface as the body 21a and the other end 21c has a step inward in the radial direction compared to the body 21a, and the second coil 22 is formed such that the proximal end 22b has a step outward in the radial direction compared to the body 22a and the other end 22c has a structure of having the same surface as the body 22a.

Therefore, when the first coil 21 and the second coil 22 are repetitively disposed in the circumferential direction, one side bodies 21a, 22a of two other types of coils adjacent to both sides are inserted into the through-hole of one type of the coil (meaning one type of the first coil and the second coil) to form the same cylinder. That is, the one side body 22a of each of two adjacent second coils 22 is inserted into the through-hole of the first coil 21, and the one side body 21a of each of two adjacent first coils 21 is inserted into the through-hole of the second coil 22.

Figure 11:
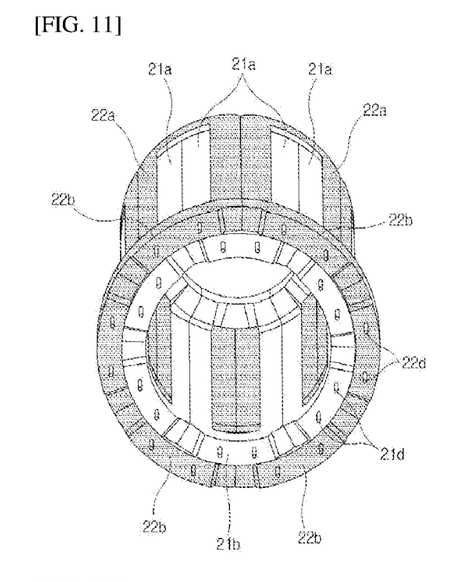
FIG. 11 is a perspective diagram illustrating the coil module illustrated in FIG. 7 in the proximal end side direction.
Figure 12:
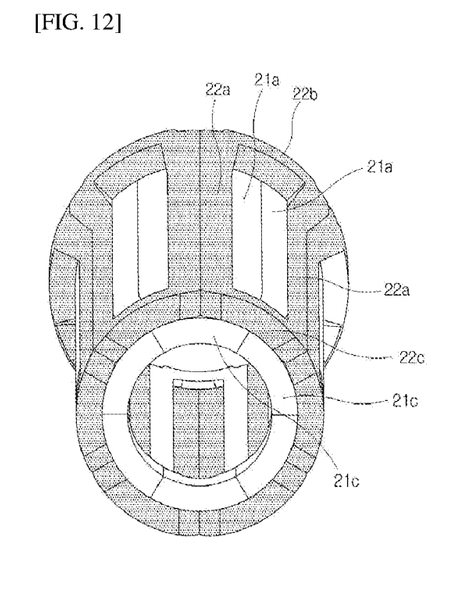
FIG. 12 is a perspective diagram illustrating the coil module illustrated in FIG. 7 in the other end side direction.

When viewing the coil module 20 assembled as described above from the ends of both sides, all of the proximal end side and the other end side are observed as a double structure in which the circumferential portion formed by the ends 21b, 21c of the first coil 21 exists inside the circumferential portion formed by the ends 22b, 22c of the second coil 22 (FIG. 11 illustrates the state of the proximal ends 21b, 22b side and FIG. 12 illustrates the state of the other ends 21c, 22c side).

However, the double structure is a structure of being shown on only the ends of both sides of the coil module 20 by forming the ends of the first coil 21 and the second coil 22 to be stepped in the different directions in order to avoid the interference between the ends of the first coil 21 and the second coil 22 when the coil module 20 is assembled, and the bodies 21a, 22a occupying most of the region of the coil module 20 are disposed on the same circumference to form one layer (may be confirmed in FIG. 5).

At this time, as described above, since one side bodies of adjacent other coils are inserted into the respective through-holes of the first coil 21 and the second coil 22, the coil module 20 seamlessly has the bodies 21a, 22a throughout the circumferential direction. That is, like the tooth 2b between the slots 2a formed on the stator core 2 in the related art, a portion in which the coil (conductor) does not exist in the circumferential direction of the motor does not exist.

As illustrated in FIG. 11, the terminals 21d, 22d protrude from the proximal ends 21b, 22b of each of the first coil 21 and the second coil 22, and the terminals 21d, 22d are connected to the circuit board 60 to supply a current.

Figure 13:
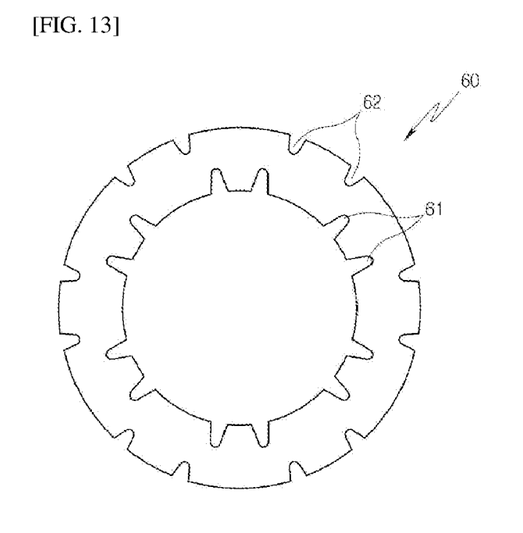
FIG. 13 is a front diagram illustrating a circuit board which is a component of the present disclosure.

As illustrated in FIG. 13, the circuit board 60 has a disc shape and the circular through-hole formed therein to form the outer circumferential surface and the inner circumferential surface. The inner circumferential surface of the circuit board 60 has a first coil terminal groove 61 formed at a location corresponding to the terminal 21d of the first coil 21, and the outer circumferential surface thereof has a second coil terminal groove 62 formed at a location corresponding to the terminal 22d of the second coil 22.

Therefore, the respective terminals 21d, 22d of the first coil and the second coil are inserted into and coupled to the corresponding terminal grooves 61, 62 of the circuit board 60, such that the circuit board 60 and the coil module 20 are physically coupled and electrically coupled. At this time, the terminals 21d, 22d are inserted in a direction perpendicular to the floor formed by the circuit board 60.

Now, the operations and effects of the motor for the seat sliding device of a vehicle according to the present disclosure will be described.

A power supply line connected to the outside of the motor is connected to the circuit board 60 inside the motor, and the plurality of first coils 21 and the plurality of second coils 22 disposed in the circumferential direction are connected to the circuit board 60. The first coils 21 and the second coils 22 are sequentially turned on/off in the circumferential direction by an operation of a control circuit configured on the circuit board 60, and the rotor sleeve 30 is rotated by the interaction between the fluctuation of the magnetic field generated at this time and the magnetic force of the permanent magnet 40. Therefore, since the nut 50 fixed to the inside of the rotor sleeve 30 is moved along the lead screw installed on the lower rail of the slide rail, the upper rail mounted with the motor is moved in the back-and-forth direction, such that the location of the seat may be adjusted in the back-and-forth direction.

Meanwhile, the motor according to the present disclosure configures the coil module 20 in which the plurality of coils 21, 22 having the shape of a cylindrically split body are consecutively disposed in the circumferential direction to have one cylindrical shape, and the coil module 20 is surrounded by the thin and cylindrical back yoke 10 to maintain the form of the structure.

As described above, the motor according to the present disclosure does not need to use the conventional stator core in which the plurality of slots and teeth are formed in the circumferential direction such that the wire-shaped coil may be wound. As described above, the size of the coil module 20 according to the present disclosure may be relatively small compared to the stator core formed with the plurality of slots and teeth, thereby reducing the size and weight of the motor.

Further, the first coil 21 and the second coil 22 configuring the coil module 20 have a rectangular ring shape and the opposite ends of both ends are formed to be stepped inward in the circumferential direction for the first coil 21 and formed to be stepped outward in the circumferential direction for the second coil 22 such that the bodies 21a, 22a of two coils may be consecutively disposed to overlap each other in the circumferential direction. Therefore, an empty space in which the coil is not installed in the circumferential direction does not exist in the coil module 20 to make a smaller coil module 20, thereby helping to implement the miniaturization and light-weight of the motor.

Further, as described above, the coil exists without an empty space in the circumferential direction of the coil module 20 and a structure of generating the cogging torque like the conventional slot or tooth does not exist, thereby reducing the cogging torque of the motor and also reducing the torque ripple. Therefore, it is possible to reduce vibration and noise when the motor is operated.

As described above, while the present disclosure has been described with reference to the exemplary embodiments illustrated in the drawings, this is merely illustrative, and it will be understood to those skilled in the art that various changes and equivalent other exemplary embodiments therefrom are possible. Therefore, the true technical scope of the present disclosure should be defined by the appended claims.

What is claimed is:

1. A motor for a seat sliding device of a vehicle comprising:
    a back yoke;
    a coil module inserted into and supported by the back yoke, and composed of a plurality of first coils and a plurality of second coils having a cylindrical shape in an assembled state;
    a rotor sleeve inserted into the coil module in a rotatable state;
    a permanent magnet installed on the outer circumferential surface of the rotor sleeve and having multiple poles formed in the circumferential direction; and
    a nut provided inside the rotor sleeve and screw-fastened to a lead screw installed on a lower rail of a seat slide rail,
    when the rotor sleeve rotates, a vehicle seat slides in the back-and-front direction along the seat slide rail.

2. The motor for the seat sliding device of a vehicle of claim 1, wherein the first coil and the second coil are formed in the shape of a cylindrically split body in which a cylinder is split every predetermined interval in the circumferential direction.

3. The motor for the seat sliding device of a vehicle of claim 2, wherein the first coil and the second coil comprise bodies composed of two straight portions parallel to each other, and the respective ends connecting both ends of the bodies, have a pair of terminals formed to protrude from the ends (proximal ends) of one sides, and are formed in a rectangular ring shape in which rectangular straight through-holes are formed inside the bodies.

4. The motor for the seat sliding device of a vehicle of claim 3, wherein the first coil and the second coil are consecutively disposed in the circumferential direction, and one side body of other type of adjacent coil is inserted into the through-hole of one type of the coil and thus the bodies of the coils consecutively exist without an empty space in the circumferential direction of the coil module.

5. The motor for the seat sliding device of a vehicle of claim 4, wherein the first coil is formed such that the proximal end of the ends of both sides is stepped outward in the radial direction with respect to the body, and the second coil is formed such that the other end opposite to the proximal end of the ends of both sides is stepped inward in the radial direction with respect to the body.

6. The motor for the seat sliding device of a vehicle of claim 1, wherein the first coil and the second coil have plastic coating layers formed on the surfaces of coil main bodies by insert-injecting the coil main bodies composed of conductors.

7. The motor for the seat sliding device of a vehicle of claim 3, wherein a circuit board is formed in a disc shape having a circular through-hole formed therein, and has terminal grooves, into which a terminal of the first coil is inserted, formed in the inner circumferential surface thereof and terminal grooves, into which a terminal of the second coil is inserted, formed in the outer circumferential surface thereof.

* * * * *